INVENTOR.
WALTER E. JACOBSON
BY Lester N. Clark
ATTORNEY

United States Patent Office 3,422,445
Patented Jan. 14, 1969

3,422,445
LOAD CELL FOR MEASURING CONCENTRIC OR ECCENTRIC LOADS
Walter E. Jacobson, Meriden, Conn., assignor to Revere Corporation of America, Wallingford, Conn., a corporation of New Jersey
Filed Sept. 21, 1966, Ser. No. 580,920
U.S. Cl. 73—141  3 Claims
Int. Cl. G01l 5/12; G01l 1/22

ABSTRACT OF THE DISCLOSURE

Load cell for measuring concentric or eccentric loads, including two annular coaxial load receiving ends connected by at least three cantilever struts spaced circumferentially of the axis of the annular ends, each strut being connected to the respective ends by a pair of integral cantilever connections projecting radially outward from the ends. The load cell is enclosed by a housing including an external cylinder fixed on one of the two annular ends and connected to the other annular end by a sealing diaphragm, and an internal cylinder fixed on said other annular end and connected to said one annular end by a sealing diaphragm.

---

This invention relates to a load cell for measuring accurately either concentric or eccentric loads. Load cells constructed in accordance with the invention may be used in connection with any apparatus where eccentric loads may be encountered, for example, thrust measuring apparatus or material testing machines. For purposes of clarity, the invention is described below as it is applied to a testing machine, but it should be clearly understood that the invention is not limited to use with such machines.

A testing machine tests a specimen of material either by placing it under a compressive load or under a tension load. Usually, the machine is operated to increase the load on the specimen gradually until it breaks. The specimen may be, for example, a cylinder of concrete which has been poured for the specific purpose of testing the strength of a particular mix. Such cylinders are commonly tested in compression. Alternatively, the machine may be required to test steel rods or columns, which may be tested either in tension or compression. Testing machines are constructed so that the active and reactive forces acting on a specimen are directly opposed to one another, acting along a common central axis. Nevertheless, the specimens undergoing test are not always uniformly manufactured, so that even if a specimen is accurately centered on the axis in the machine, the specimen may eccentrically resist the applied force so that the testing machine is stressed eccentrically.

While some machines test specimens only in tension, and others only in compression, many machines are adaptable to provide either compression or tension tests. One such machine has two fixed crossheads, spaced apart and generally parallel. A movable crosshead is located between the fixed crossheads and parallel thereto, and may be driven toward one or the other by suitable drive mechanism. A specimen to be tested is placed between one of the fixed crossheads and the movable crosshead, which is then driven to load the specimen. Commonly, a specimen to be tested in tension is placed between the movable crosshead and a particular one of the fixed crossheads. On the other hand, a specimen to be tested in tension is placed between the movable crosshead and the other fixed crosshead. Nevertheless, it is possible to test a specimen in either tension or compression between either one of the fixed crossheads and the movable crosshead.

It is an object of the present invention to provide a load cell which can measure forces within a greater range of eccentricity than the previously known load cells, while maintaining its accuracy of measurement.

Another object is to provide a load cell adapted to be mounted between the movable crosshead of a testing machine and a specimen being tested.

Another object is to provide a load cell which is annular in form and adapted at one end for attachment to a support and at the other end for connection to a load to be measured. A further object is to provide a load cell of the type described, in which said other end may be adapted to receive either a tension or compression load. A still further object is to provide such a load cell which may be stressed compressively by a rod extending through the middle of the annular cell.

Another object is to provide a load cell including an improved apparatus for calibrating a plurality of separate strain sensitive elements of the load cell so that the operation of all the elements is coordinated.

Another object of the invention is to provide a load cell of the type described, in which the sensitivity of the resistance elements to local temperatures is made independent of local temperature gradients by placing the strain sensitive elements on surfaces of the same contour, with all of the elements at equal distances from the end of the cell where the load is applied and also at equal distances from the end of the cell where the reaction force is applied.

There is shown and described in my copending application Ser. No. 409,168, filed Nov. 5, 1964, entitled "Apparatus for Measuring Force", now Patent No. 3,315,203, a load cell including a load receiving end portion and a reactive force receiving end portion and a reactive force receiving end portion, with four struts interconnecting said end portions, and the strain sensitive elements mounted on the four struts. The strain sensitive elements are all mounted on surfaces of the same curvature and are all located at equal distances from the load receiving end, and at equal distances from the reactive force receiving end. The advantages of temperature stability which are attained by the use of that structure are also attained in the load cell of the present invention, which may to that extent be described as an improvement on the invention of said copending application.

The foregoing and other objects of the invention are attained in the load cell described herein, which comprises a lower generally cylindrical portion adapted for mounting on a support, and an upper generally cylindrical portion to which the load to be measured may be applied. The two cylindrical portions are connected to each other integrally by means of four peripherally spaced struts. The two cylindrical portions have a common axis and the struts are spaced radially from that axis by equal distances. Each strut has a radially inwardly facing surface and a radially outwardly facing surface of similar contour, the strain sensitive elements being placed on these surfaces. The struts are of equal cross-section taken in a plane perpendicular to the axis of the load cell. The cross-sections of the struts are symmetrical with respect to radial lines drawn from the cell axis through the centers of the struts. Those radial lines define equal angles at their point of intersection with the axis. The two cylindrical end portions and the struts together constitute one integral block of material. The struts are cantilevered out from the cylindrical portions so that they are located radially farther from the axis than any force transmitted through them to the cylindrical portions. Such a cell is relatively unaffected by eccentric loading, as long as the center of the applied load lies within the circle defined by the centers of the strut cross-sections.

Other objects and advantages of the invention will become apparent from a consideration of the following specification and claims, taken together with the accompanying drawings.

Figure 1:
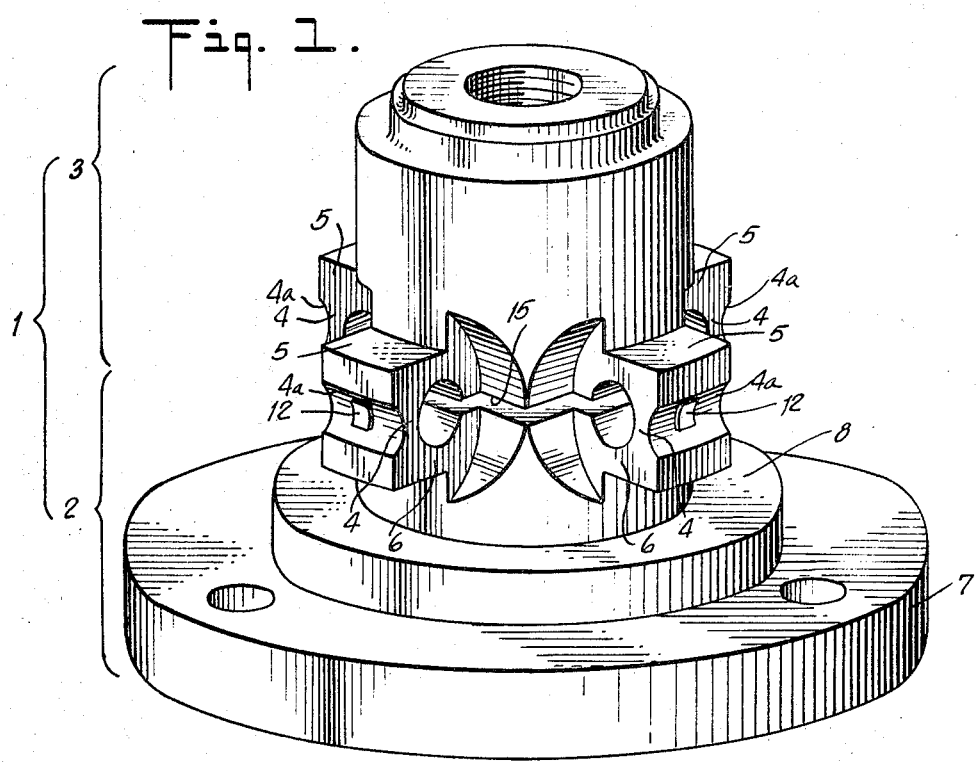
FIG. 1 is a perspective view of a load cell embodying the invention, with the cover removed.

The load cell as shown in FIG. 1 includes an integral block of material generally indicated by the reference numeral 1 and including a lower cylindrical end 2 adapted to receive a reactive force; an upper cylindrical end 3 adapted to receive the force to be measured; and four peripheral struts 4 connecting the cylindrical end portions 2 and 3. Each strut 4 has its upper end connected to the upper block 3 by a cantilever connection 5. Each strut 4 also has its lower end connected to the lower cylindrical end 2 by a cantilever connection 6.

The terms "upper" and "lower," "vertical" and "horizontal" are used herein to describe the orientation of the load cell as shown in the accompanying drawings. While these terms are convenient for purposes of description and illustration, it should be understood that the load cell of my invention may be used in any angular orientation, and that the surfaces which appear vertical in the drawing may in fact be horizontal in any particular installation.

Figure 4:
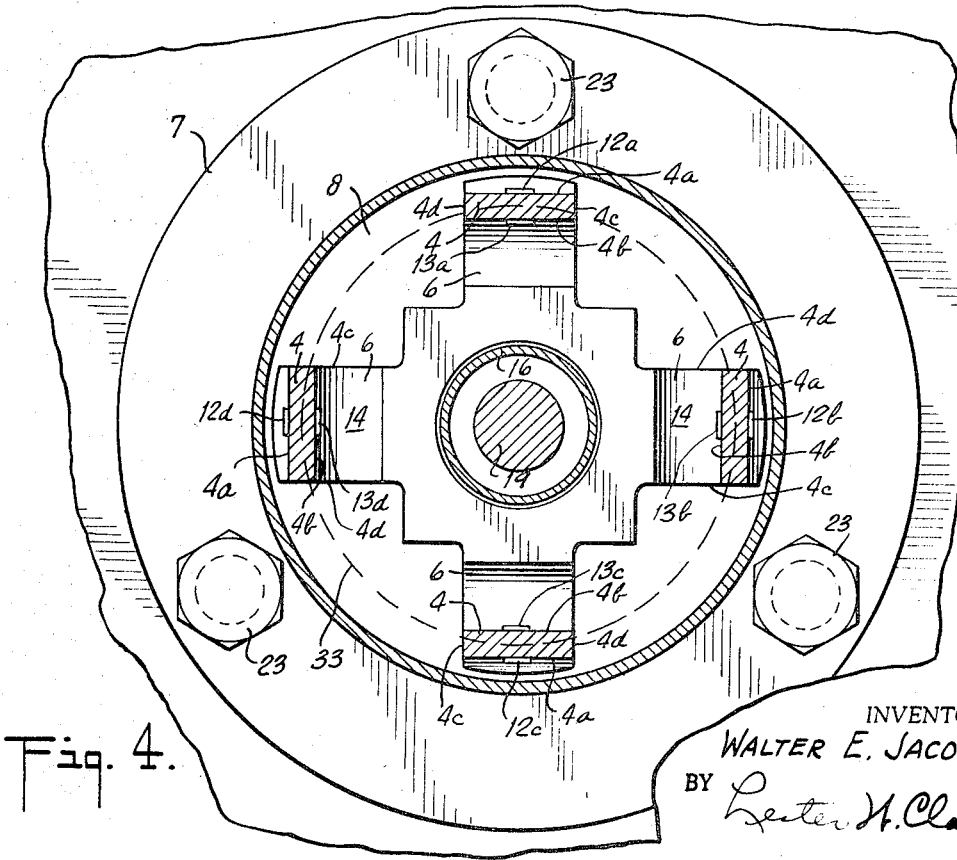
FIG. 4 is a horizontal cross-sectional view taken on the line 4—4 of FIG. 2.

The lower cylindrical end 2 has a bottom flange 7 projecting outward from its periphery and adapted for mounting on a suitable support by means of bolts 23, as indicated in FIG. 4. The lower cylindrical end 2 also has another flange 8, above the mounting flange 7 and adapted to be closely received within a cylindrical casing 9. A diaphragm 10 is welded at its outer periphery to the upper end of the casing 9 and at its inner periphery to a projection 11 formed near the upper end of the upper cylindrical member 3. The projection 11, of relatively small cross-section is formed to minimize the volume of material of the block 1 which must be heated during the welding process, since heat adversely affects the elasticity and hence the stress-strain characteristics of the block.

The struts 4 are provided with radially outwardly facing arcuate surfaces 4a, on each of which is mounted a strain sensitive resistance element 12a, 12b, 12c, 12d as by bonding, or the like. Each strut 4 is provided with a radially inwardly facing surface 4b having a radius of curvature equal to that of the surface 4a. On the inwardly facing surfaces 4b are mounted another set of strain sensitive resistance elements 13a, 13b, 13c, 13d. Each surface 4b is formed by part of the surface of a bore 14 extending through the block 1 and located radially outwardly from the axis of the block. The bores 14 are interconnected by a slot 15 which separates the lower cylindrical portion 2 from the upper cylindrical portion 3, so that substantially all the strain carried by the load cell is taken by the struts 4.

Each strut 4 is defined by two plane surfaces 4c and 4d (see FIG. 4) extending parallel to the axis of the cell and also parallel to the radial line extending from the axis through the center of the strut. Each strut 4 is also in part defined by its associated bore 14, the recess 4a, and part of the peripheral surface of the block above and below the recess 4a. The ends of the struts 4a are defined by a pair of plane end surfaces 4e and 4f extending at right angles to the axis of the bore. The end surfaces 4e and 4f cooperate with the surfaces 4c and 4d and the bore 14 to define the cantilever connections 5 and 6.

The housing for the load cell is completed by a cylinder 16 (FIGS. 3 and 4) located within the lower cylindrical section 2 and having its upper end abutting a shoulder 3a on the upper cylindrical section 3. The lower end of the cylinder 16 is connected to the lower section 2 by a flexible diaphragm 17 welded at its inner periphery to the cylinder 16 and at its outer periphery to the cylindrical section 2. It may be seen that the shell 9 and the cylinder 16 cooperate with their associated diaphragms 10 and 17 to enclose the sensitive parts of the load cell, including the struts 4 and strain sensitive elements 12 and 13, and keep them free from dust and moisture.

The struts 4 carry all the load applied to the cell except that relatively small portion which is carried by the diaphragms 10 and 17. This small portion may usually be ignored, although in certain cases, it must be taken into account.

Figure 2:
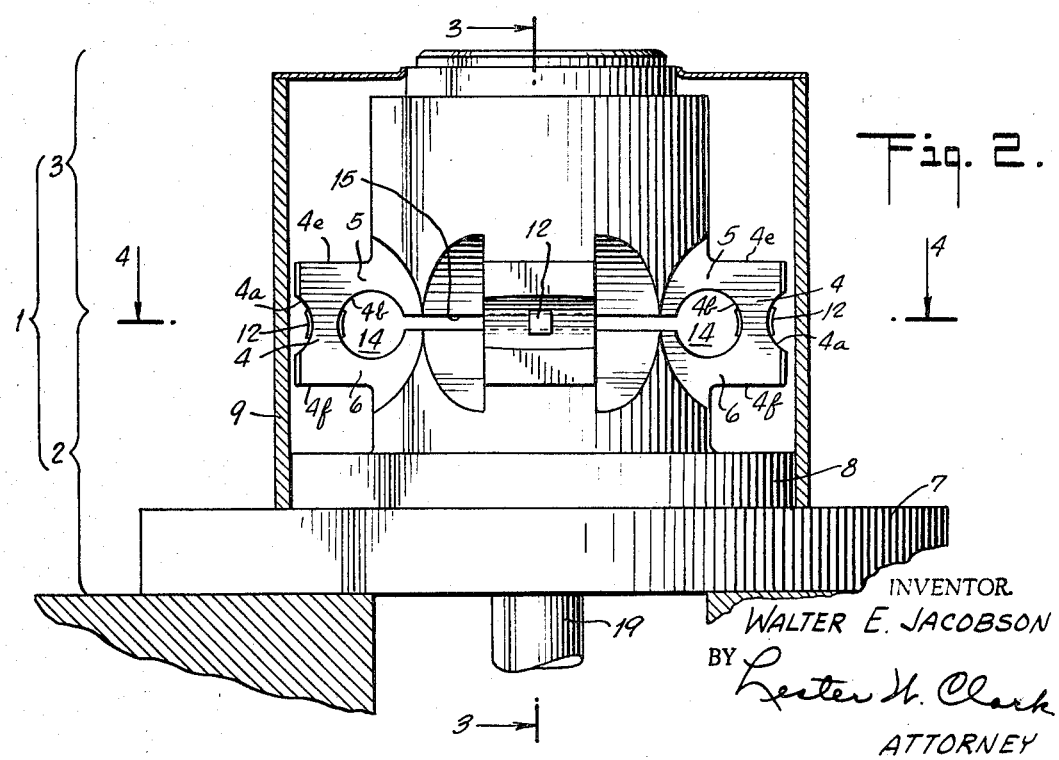
FIG. 2 is an elevational view of the load cell of FIG. 1, with the cover shown in cross-section.
Figure 3:
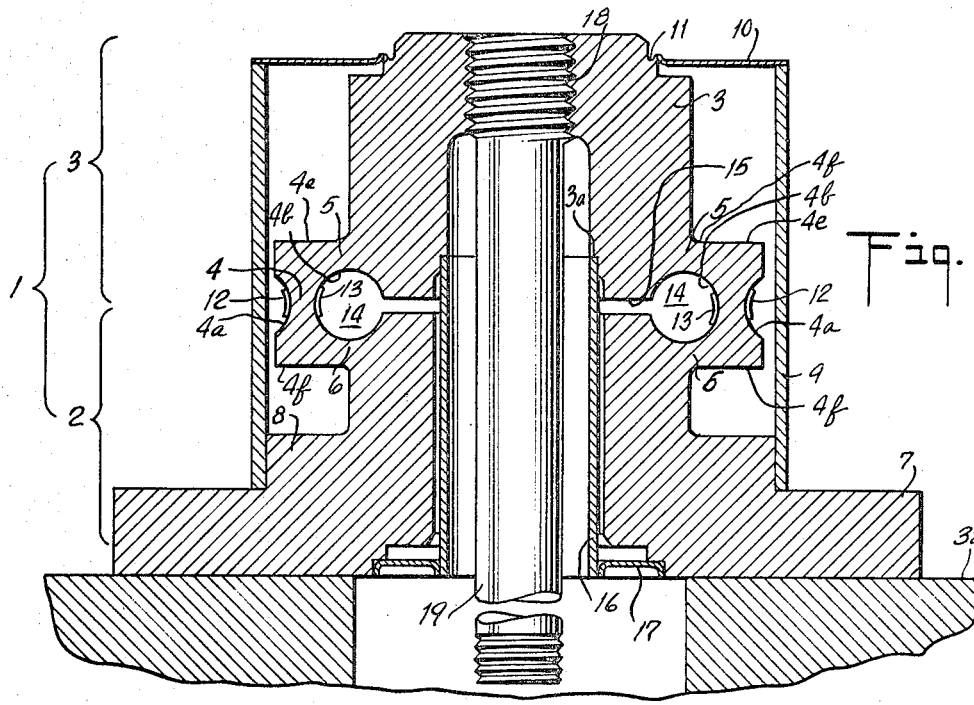
FIG. 3 is a vertical cross-sectional view taken on a plane through the vertical axis of the load cell of FIGS. 1 and 2.
Figure 6:
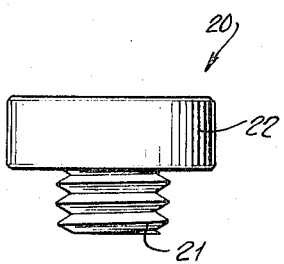
FIG. 6 is an elevational view of a load adapter which may be used in place of the load adapter shown in FIGS. 2, 3 and 4.

The upper cylindrical end 3 of the load cell is provided on its inner surface with an internally threaded section 18 which is adapted either to receive a force applying road as shown at 19 in FIGS. 2, 3 and 4, or an adapter force applying member 20, shown in FIG. 6, having a stem 21 and a head 22 adapted to abut against the upper surface of the load cell.

Figure 5:
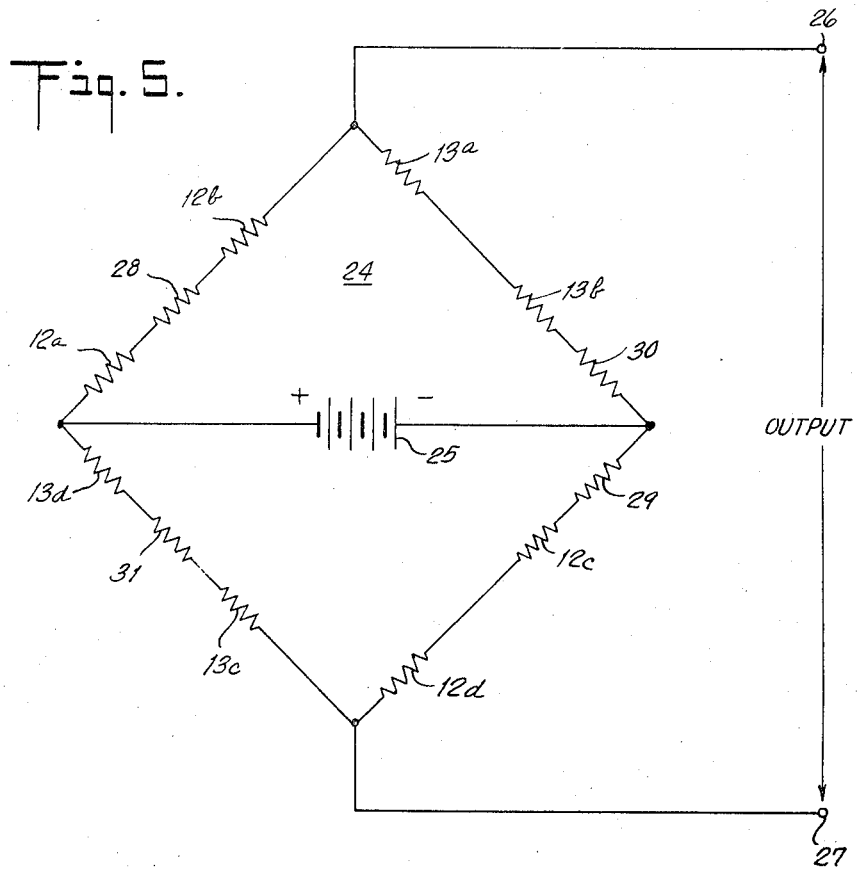
FIG. 5 is a wiring diagram of a bridge circuit in which the strain sensitive elements of the load cell may be connected.

FIG. 5 illustrates a bridge circuit, generally indicated at 24. It may be seen that all of the strain sensitive resistive elements 12a, 12b, 12c, 12d, 13a, 13b, 13c and 13d are connected in the various arms of the bridge. Electrical energy is supplied to two opposite terminals of the bridge circuit from a battery 25. The other two terminals of the bridge circuit are connected to output terminals 25, 27. It will be recognized that it is difficult to machine the struts 14 so that the dimensions of each one are exactly equal to the dimensions of all the others. Consequently, in any practical structure, the struts will have varying thicknesses, and hence, varying sensitivities.

Differences in the sensitivities in the struts may also result from slight differences in the distances of the struts from the center of the load cell.

Where these differences cause changes in the load cell otuput with eccentric loading, the difficulty may be eliminated by equalizing the output of the four individual struts. This may be done by taking separate strain measurements at each individual strut and then adding shunt or series resistances as required to equalize strut sensitivity to the degree of accuracy desired. Fixed resistances 28, 29, 30 and 31 shown in FIG. 5 present an example of one means of making this adjustment. In any particular cell, compensating resistance may be required for only one strut or for two, three, or all of them. The two strain sensitive elements of each strut are stressed oppositely, i.e., one in compression and one in tension, and are connected in adjacent arms of the bridge so that they act cumulatively therein. Consequently, it is only necessary to add a fixed resistance in series with one of the two strain sensitive elements for each strut. For example, the strut carrying resistance elements 12a and 13a has a fixed resistance 28 inserting only in series with the strain sensitive resistance 12a.

Operation

When the testing machine carrying the load cell is used to stress a specimen in tension, the arrangement shown in FIG. 3 is used. The flange 7 is attached to the movable crosshead of the testing machine, shown generally at 32. The specimen to be tested is connected to the lower end of the rod 19. The lower end of the test specimen is connected to a fixed crosshead of the testing machine.

The movable crosshead 32 is then driven upwardly, stressing the specimen in tension and stressing the block 1 generally in compression. The strain sensitive elements 13 are all stressed in compression and the strain sensitive elements 12 are all stressed in tension.

When its is desired to test a specimen by stressing it in compression, the rod 19 is removed and the adapter 20 of FIG. 6 is threaded into the top of the load cell block 1. The specimen to be tested is placed between the adapter 20 and the upper crosshead of the testing machine. The movable crosshead 32 is again driven upwardly, and both the specimen and the load cell 1 are stressed generally in compression. Again, the strain sensitive elements 13 are stressed in compression and the strain sensitive elements 12 are stressed in tension.

The load cell illustrated may be mounted on the under side of the movable crosshead 32 instead of on the top, as illustrated in FIG. 3. In that case, if the specimens were placed as described above, then the load cell would always be stressed generally in tension and the strain sensitive elements 13 would be stressed in tension, with the strain sensitive elements 12 being stressed in compression. It may be seen that the load cell illustrated, may be used for either direction of operation of the movable crosshead of the testing machine, and that it may be stressed either in compression or in tension for either direction of movement.

Although a load cell having four struts is illustrated, the number of struts employed may vary. A minimum of three is necessary in order to accommodate the eccentric load whose center is displaced from the axis of the cell but within the circle defined by the centers of the struts 14 and illustrated at 33 in FIG. 4. A larger number of struts may be desirable where great diameters of eccentricity are expected.

In any load cell constructed in accordance with the invention, the radius from the axis of the load cell to the center of each strut should be the same. The cross sections of all the struts should be equal, and those cross sections should be symmetrical with respect to the radial lines running from the axis of the cell through the center of the strut. Furthermore, the radial lines from the centers of the several struts to the axis of the load cell should make equal angles at the center of the cell.

It should be understood that minor variations in all of the dimensions and angles mentioned in the preceding paragraph may be accommodated by the electrical calibration method discussed above. Nevertheless, it is desirable in constructing the mechanical parts of the load cell to hold the dimensional tolerances as closely as can conveniently be done.

While I have shown and described the preferred embodiment of my invention, other modifications will readily occur to those skilled in the art, and I therefore intend my invention to be limited only by the appended claims.

I claim:
1. A load cell including:
 (a) an integral block of material having opposite ends, one of said ends being adapted to receive a force to be measured and the other end adapted to receive an opposite reactive force;
 (b) said block comprising at least three peripheral struts extending parallel to an axis extending through said ends, said struts being spaced radially from said axis by equal distances, each strut having a radially inwardly facing surface and a radially outwardly facing surface, said struts being of equal cross-section in a plane perpendicular to said axis and having said cross-sections symmetrical with respect to radial lines drawn from said axis through the centers of the struts, said radial lines defining equal angles at their point of intersection with the axis;
 (c) said block further comprising a first annulus at said one end and a second annulus at said other end, said annuli being connected only by said struts;
 (d) said block having an aperture extending between said struts so that substantially the entire load on the block is carried by the struts;
 (e) strain sensitive elements mounted on said inwardly facing surfaces and said outwardly facing surfaces; and
 (f) housing means enclosing said strain sensitive elements, said housing means including:
  (1) a flange on said block projecting outwardly from said other end thereof to a periphery radially outward of said struts;
  (2) a first cylindrical sleeve attached at one end to said flange and encircling said struts and said one end of the block;
  (3) a first flexible diaphragm extending between and sealed to said one end of the block and the adjacent end of said sleeve and closing the space between the block and the sleeve;
  (4) a second sleeve located within said second annulus and spaced therefrom, said second annulus having its inner end sealed to the first annulus on the opposite side of the aperture from the second annulus;
  (5) a second diaphragm extending between and sealed to said second annulus and to the adjacent end of said second sleeve and closing the space between the block and said second sleeve;
  (6) said first and second sleeves and first and second diaphragms cooperating with said block to define a completely closed space within which said strain sensitive elements are located.
2. A load cell, comprising:
 (a) an integral block of material having opposite ends, one of said ends being adapted to receive a force to be measured and the other end adapted to receive an opposite reactive force;
 (b) said block comprising at least three peripheral struts extending parallel to an axis extending through said ends, said struts being spaced radially from said axis by equal distances, each strut having a radially inwardly facing surface and a radially outwardly facing surface, said struts being of equal cross-section in a plane perpendicular to said axis and having said cross-sections symmetrical with respect to radial lines drawn from said axis through the centers of the struts, said radial lines defining equal angles at their point of intersection with the axis;
 (c) said block further including, for each strut, a pair of cantilever connections projecting radially outward from the main block to the ends of the strut;
 (d) each of said struts and its cantilever connections being defined by:
  (1) two plane surfaces parallel to said axis and to the radial line extending from the axis through the center of the strut;
  (2) a portion of the peripheral surface of the block;
  (3) a bore extending between said parallel surfaces and at right angles thereto, the axis of said bore intersecting said radial line;
  (4) an arcuate recess in the peripheral surface of the block having an axis of curvature parallel to the axis of the bore; and
  (5) a pair of plane end surfaces extending at right angles to the axis of the bore and to said parallel surfaces;
 (e) said block having an aperture extending between said struts so that substantially the entire load on the block is carried by the struts; and
 (f) strain sensitive elements mounted on said inwardly facing surfaces and said outwardly facing surfaces.
3. A load cell as defined in claim 2, in which said aperture includes the bores defining the inner surfaces of said struts and a slot extending at right angles to said axis and joining all said bores.

References Cited
UNITED STATES PATENTS
| | | | |
|---|---|---|---|
| 2,855,489 | 10/1958 | Ruge | 73—88.5 XR |
| 3,124,770 | 3/1964 | Ciavatta | 73—141 XR |
| 3,240,065 | 3/1966 | Taber | 73—141 XR |
| 3,315,202 | 4/1967 | Johns et al. | 73—141 XR |

FOREIGN PATENTS
882,989  11/1961  Great Britain.

RICHARD C. QUEISSER, *Primary Examiner.*
C. A. RUEHL, *Assistant Examiner.*

U.S. Cl. X.R.

73—88.5; 338—5